Nov. 8, 1938.  H. F. GADE  2,135,637
SET SCREW
Filed April 26, 1935  2 Sheets-Sheet 1

Inventor:
Harald F. Gade
by his Attorneys
Howson & Howson

Nov. 8, 1938.　　　　　H. F. GADE　　　　　2,135,637

SET SCREW

Filed April 26, 1935　　　　2 Sheets-Sheet 2

Inventor
Harald F. Gade
by his Attorneys
Howson & Howson

Patented Nov. 8, 1938

2,135,637

UNITED STATES PATENT OFFICE 2,135,637

SETSCREW

Harald F. Gade, Philadelphia, Pa., assignor to Standard Pressed Steel Co., Jenkintown, Pa., a corporation of Pennsylvania Application April 26, 1935, Serial No. 18,487

8 Claims. (Cl. 151—22)

This invention relates to improvements in set screws, and while applicable in principle to set screws of any type has an application of particular importance to so-called hollow and headless set screws.

One of the principal disadvantages of set screws generally has resided in the difficulty of providing an adequate lock to hold the screw securely in position and to prevent the natural tendency of the screw to loosen under operating conditions.

A principal object of the present invention is to provide a set screw embodying in its structure simple and effective means for locking the screw in position.

Another object of the invention is to provide a set screw of the stated character, wherein the locking means, while effective to maintain the screw in position under normal conditions, will permit retraction of the screw when necessary, and wherein the said locking means is of such character as not unduly to complicate or increase the cost of the manufacturing process.

Figure 1:
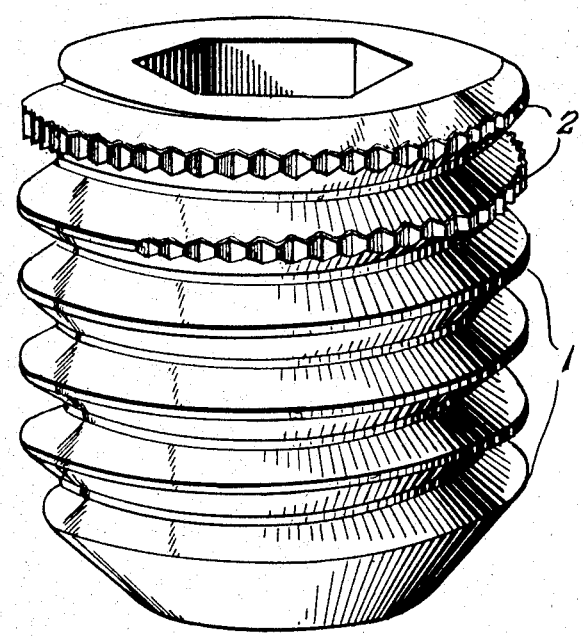
Figure 1 is a view in perspective of a set screw made in accordance with my invention.
Figure 2:
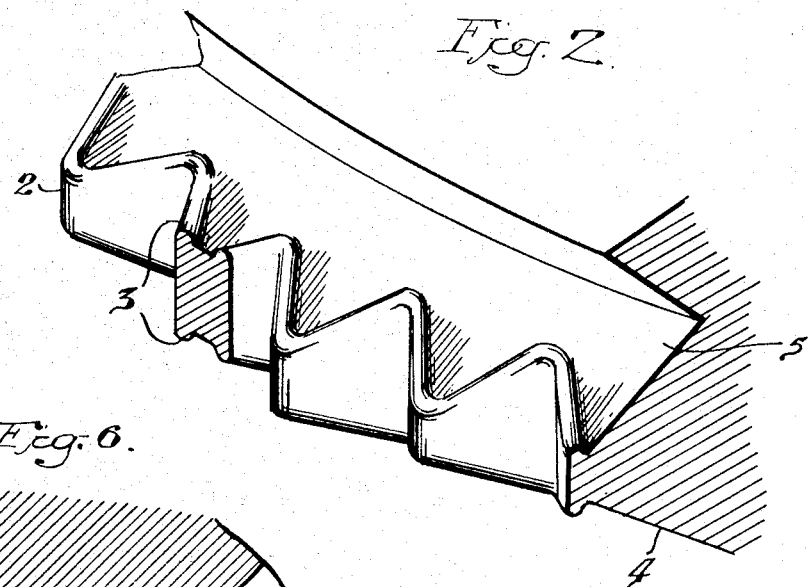
Fig. 2 is an enlarged fragmentary sectional perspective view illustrating the lock thread formation.

With reference to Figs. 1 and 2 of the drawings, it will be noted that in the set screw therein illustrated, which is of the hollow and headless type, the threads 1 at the inner or working end are of normal formation, and that a relatively small section 2 of the thread at the outer end of the screw is in effect serrated and to a limited degree upset, so that at the peripheral edge the threads in this section are at least in part of greater width than the normal thread in the same circumferential plane.

In a preferred method of manufacturing set screws in accordance with my invention, I produce the screw by normal machine operation and in accordance with the standard practice. I then, as illustrated in the drawings, slightly deform a relatively short section of the thread at the outer or socket end by means of a simple knurling operation. As illustrated, this knurling operation has the effect of serrating and, at the same time, upsetting the peripheral edges of the thread, with the formation of beads 3 at the edges of the serrations and on both the inner and outer faces, 4 and 5, of the thread. By this means, the effective thickness of the peripheral edge of the thread within the knurled section is made somewhat greater than the thickness of the corresponding portion of the normal thread, and this increased thickness is confined primarily to a narrow area at the peripheral edge of the thread and at each side thereof following the irregular path of the knurlings. When a screw of this novel construction is entered in the threaded hole provided for its reception, the normal threads extending over the major portion of the screw from the inner end mesh with the threads of the hole in normal manner, whereas the knurled section of the thread, by reason of its abnormal form, tends to bind within the threads of the hole so that the screw is effectively locked in the final adjusted position. While the set screw as described will remain locked in position under all normal conditions, the screw may readily be removed if occasion requires. It will be noted that by reason of the fact that the locking device is confined entirely to a relatively small section at the outer ends of the threads, the inner and major portions of the threads remain unchanged. My invention accordingly involves no undesirable destructive effects upon the major portions of the threads either of the threaded hole or of the set screw.

Figure 3:
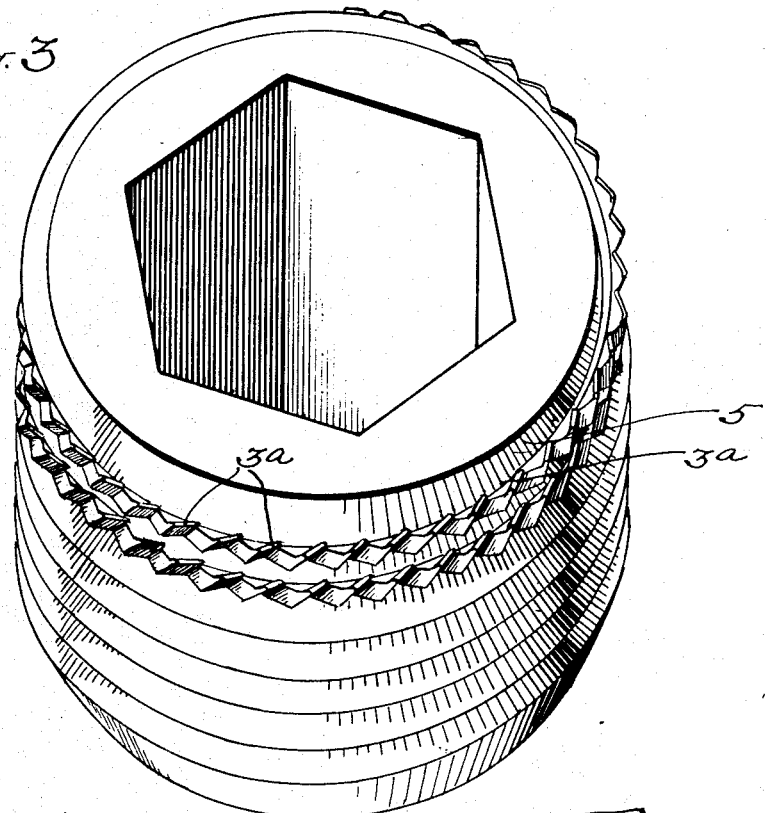
Fig. 3 is a perspective view similar to that of Fig. 1 showing a preferred embodiment of my invention.
Figure 4:
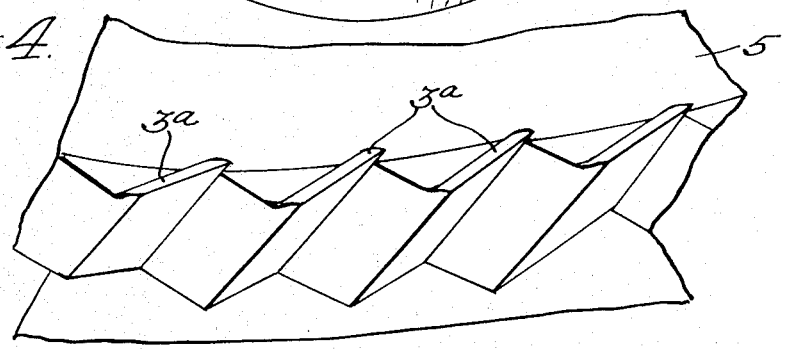
Fig. 4 is an enlarged fragmentary perspective view of the thread formation shown in Fig. 3.
Figure 5:
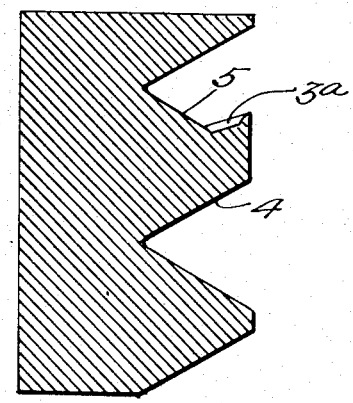
Fig. 5 is a fragmentary sectional view of the thread shown in Figs. 3 and 4.

A preferred embodiment of my invention is illustrated in Figs. 3, 4, and 5. In this case, the serrations, instead of being parallel with the longitudinal axis of the screw, are inclined to said axis, and preferably the serrations are inclined from the inner surface 4 of the thread toward the outer surface 5 in the direction in which the screw is rotated when released. When these diagonal serrations are formed by knurling, it is possible to obtain an upset formation corresponding to that shown, wherein the bead 3a and hence the major increased thickness of the thread caused by the upsetting action is located at one side of the respective serrations, namely, that side which slopes inwardly toward the rising portion of the helix as viewed in Fig. 3. I prefer also to confine the "upset" to the outer face of the thread as illustrated, and this may be accomplished by a machine operation subsequent to the knurling operation to remove the upset fin and bead from the lower surface of the thread. In this manner, I provide a screw in which the characteristic upset thread formation is confined to the outer surface of the thread and takes the form substantially of a series of beads extending diagonally inward from the peripheral edge of the thread and toward those portions of the helix which lead when the screw is backed out of the threaded opening. With this arrangement the smooth inner surfaces of the thread find a substantially normal solid bearing on the threads of the tapped hole while the binding action occurs between the outer upset surface of the thread of the screw and the reverse surface of the receiving thread. The locking action in this form of screw has been found to be relatively effective and efficient.

Figure 6:
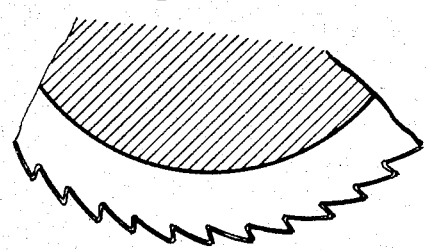
Fig. 6 is a fragmentary sectional view illustrating a further modification within the scope of the invention.

It will be apparent that the invention in principle may find other embodiments than those illustrated in Figs. 1 to 5. A somewhat similar effect may be obtained, for example, by a simple upsetting of the peripheral edges of the threads within the limited area described through the medium, for example, of a smooth-faced roller. The knurling, however, is preferred both by reason of the relative mechanical simplicity of the knurling operation as compared with a corresponding operation with a smooth roller, and by reason further that the upset formation obtained by the knurled tool is more effective in the locking function. In Fig. 6, I have illustrated a further modification wherein the serrations or recesses at the periphery of the thread are in effect sawtoothed and project outwardly in a direction reverse to that in which the set screw is turned for tightening. There may be still other modifications within the scope of the invention.

I claim:

1. As a new article of manufacture, a screw-threaded element having at least a portion of its thread upset at the crest by knurling, said upset being confined to a small part only of the total depth of the thread.

2. As a new article of manufacture, a screw-threaded element having at least a portion of its thread upset at the crest by knurling, said upset being confined to a small part only of the total depth and to one face only of the thread.

3. As a new article of manufacture, a screw-threaded element having at least a portion of its thread upset at the crest by knurling, said knurlings being inclined to the longitudinal axis of said element.

4. As a new article of manufacture, a screw-threaded element having at least a portion of its thread transversely expanded at the crest, said expanded portion being adapted to jam in a normal thread in which said element is mated to thereby relatively lock said threads.

5. As a new article of manufacture, a set screw having a portion of its thread transversely expanded at the crest, said expanded portion being confined to a section of the thread adjacent the outer end of said screw.

6. As a new article of manufacture, a set screw having a portion of its thread transversely expanded at the crest by knurling, said knurlings being confined to a section of the thread adjacent the outer end of the screw.

7. As a new article of manufacture, a screw-threaded element having at least a portion of its thread transversely expanded at the crest by knurling, said expanded portion being adapted to jam in a normal thread in which said element is mated to thereby relatively lock said threads.

8. As a new article of manufacture, a screw-threaded element having at least a portion of its thread provided with spaced recesses, the edges of which are defined by narrow ridges projecting outwardly beyond the confines of the normal thread contour.

HARALD F. GADE.